F. C. HRON.
CULTIVATOR TONGUE SUPPORT.
APPLICATION FILED JAN. 4, 1912.
1,061,845.
Patented May 13, 1913.
2 SHEETS—SHEET 2.
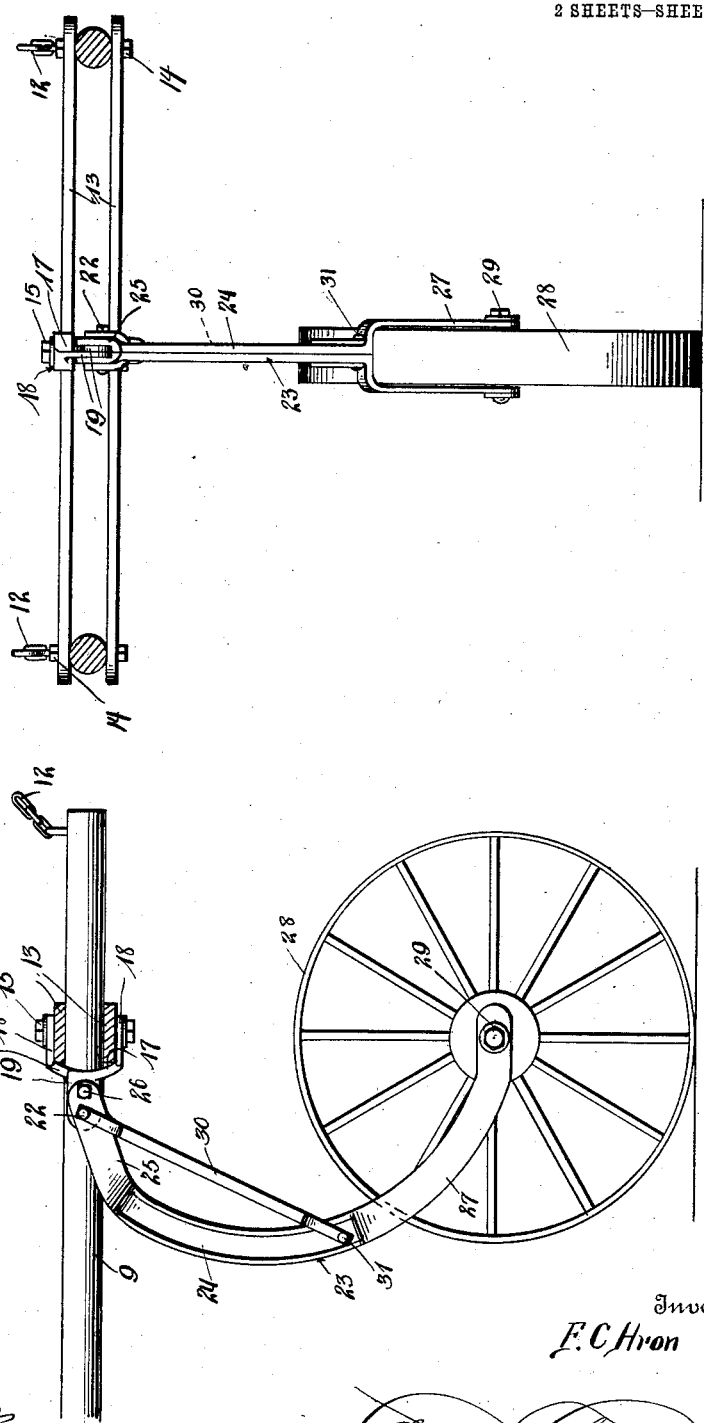

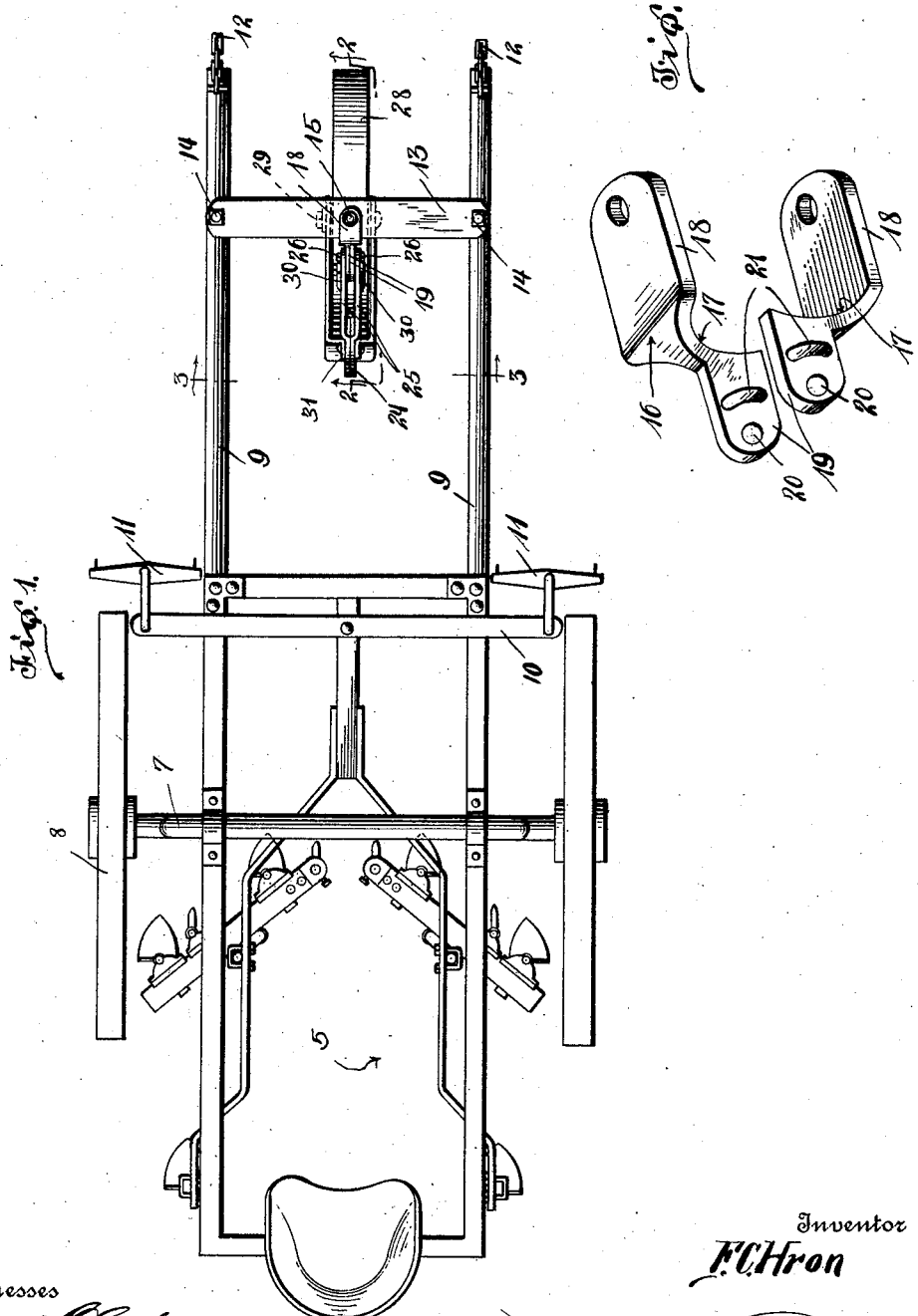

UNITED STATES PATENT OFFICE.

FRANK C. HRON, OF TYNDALL, SOUTH DAKOTA.

CULTIVATOR-TONGUE SUPPORT.

1,061,845. Specification of Letters Patent. Patented May 13, 1913.

Application filed January 4, 1912. Serial No. 669,355.

*To all whom it may concern:*

Be it known that I, FRANK C. HRON, a citizen of the United States, residing at Tyndall, in the county of Bonhomme, State of South Dakota, have invented certain new and useful Improvements in Cultivator-Tongue Supports; and I do hereby declare the following to be a full, clear, and exact description of the invention, such as will enable others skilled in the art to which it appertains to make and use the same.

This invention relates to an improvement in tongue supports especially adapted for use in connection with double row cultivators.

The principal object of the invention is to provide a support for the purpose described which is adapted to take away the weight of the tongues of the cultivator from the horses.

Another object of the invention is to provide a support for the purpose described which includes a pivoted ground wheel adapted to readily swing when the cultivator is being turned.

A further object of the invention is to provide a tongue support for double row cultivators which can be readily attached to or detached from any cultivator including a pair of tongues now in general use without any material alterations to said cultivator.

A still further object of the invention is to provide a tongue support of the character described, which is composed of a minimum number of parts, is therefore simple in construction and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a top plan view of a double row cultivator showing my improved tongue support attached thereto, Fig. 2 is a detail vertical sectional view taken on the line 2—2 of Fig. 1, Fig. 3 is a sectional view taken on the line 3—3 of Fig. 1, Fig. 4 is a perspective view of the clevis.

Like reference numerals designate corresponding parts in all the figures of the drawings.

Referring to the drawings, 5 designates the usual frame of a double row cultivator, and to which are attached the usual earth-working tools. This frame is supported upon an axle 7 journaled in ground wheels 8—8. Extending forwardly from the frame is a pair of spaced tongues 9—9, and secured to the tongues slightly in advance of the frame is a draft element 10. This element projects on either side of the tongues and on each end thereof is mounted a swingletree 11 to each of which a draft animal is to be attached. Secured to the forward end of each tongue 9 is a chain 12 adapted to be connected to the collar of the draft animal in the ordinary manner.

My invention consists in a support for the tongues 9 whereby the weight of said tongues will be taken away from the draft animals. Disposed transversely across the tongues 9 near their forward ends and arranged above and below the tongues are spaced supporting members 13—13, which are connected to said tongues by means of bolts 14. Centrally secured to said members 13 by means of a bolt 15 is a clevis which is indicated as a whole by the reference numeral 16. This clevis is formed of two sections 17—17 and each section comprises a body portion 18 adapted to engage the respective member 13 and an offset ear 19 which projects from one end of the body portion, and is disposed in a plane at right angles thereto. Each of these ears is formed with a circular opening 20 and an arcuate opening 21. A pivot bolt 22 is disposed within the openings 20 for permitting the sections 19 to be swung thereupon in order to accommodate the same for various thicknesses of cultivator tongues.

The invention further comprises a standard which is indicated as a whole by the reference numeral 23. This standard consists of opposed curved members 24—24, the upper ends 25—25 thereof being outwardly bent and disposed on opposite sides of the ears 19 of the clevis. Openings are formed in each end 25 of the members, and these openings register with the openings 20 and 21 of said clevis, the bolt 22 also passing through certain of these openings, as will be readily understood. A bolt 26 is disposed in the other of said openings of the ends 25 and through the arcuate slots 21 of said clevis sections, whereby the standard 23 is held against vertical swinging movement. The lower ends 27—27 of the members 24 of the standard are also bent outwardly to receive a ground wheel 28, which is attached to said standard by means of an axle 29 journaled in the lower free ends of said standard members. A brace 30 has its lower end bifurcated to receive the standard 23 directly above the outwardly bent ends 27. This end of the brace is connected to the standard by means of a bolt 31, said bolt also serving to hold the members 24—24 of the standard against lateral spreading. The upper end of the brace 30 is also bifurcated to receive the upper ends 25 of the members 24 of the standard, and is attached to the bolt 22. It will thus be observed that the bolt 22 serves to connect the ears 19 of the clevis sections, the ends 25 of the members 24 of the standard, and is attached to the bolt 22. It will thus be observed that the bolt 22 serves to connect the ears 19 of the clevis sections, the ends 25 of the standard 23 and the upper ends of the brace 30.

From the foregoing, it will be observed that when the cultivator is driven forwardly, the wheel 28 through the medium of the standard 23, will assume all the weight of the tongues 9, and when turning the cultivator the wheel 28 will readily follow the path desired.

What is claimed is:

1. In a wheeled implement including a pair of spaced tongues and a transverse supporting member secured to said tongues; a clevis connected to said member, said clevis consisting of two sections, each section comprising a body portion engaging the supporting member and terminating at one end in an offset ear, the ears of said sections being disposed in opposed relation, a pivot bolt connecting said ears, a depending standard connected to said pivot bolt, and a ground wheel carried by said standard.

2. In a wheeled implement including a pair of spaced tongues and a transverse supporting member secured to said tongues; a clevis connected centrally to said member, said clevis consisting of two sections, a pivot bolt connecting said sections, a depending standard consisting of opposed members, the upper ends thereof being outwardly bent and connected to the pivot bolt of the clevis, a ground wheel disposed between and journaled in the lower ends of the members of said standard, a bolt connecting the members of the standard above said wheel, and a brace for the standard having one end connected to the last mentioned bolt and the other end connected to the pivot bolt of the clevis.

3. In a wheeled implement including a pair of spaced tongues, and a transverse supporting member secured to said tongues, a clevis connected to said member, said clevis consisting of two sections, a pivot bolt connecting said sections, a depending standard consisting of opposed members, the upper ends thereof being outwardly bent and connected to said pivot bolt of the clevis, and a ground wheel disposed between and journaled in the lower ends of the members of said standard.

In testimony whereof, I affix my signature, in presence of two witnesses.

FRANK C. HRON.

Witnesses:
W. L. REDDEN,
JULIA M. PTAK.

Copies of this patent may be obtained for five cents each, by addressing the "Commissioner of Patents, Washington, D. C."